United States Patent [19]
Parker et al.

[11] 3,782,085
[45] Jan. 1, 1974

[54] LAWN MOWER AND AUXILIARY UNIT WITH CONTROL MEANS

[75] Inventors: James M. Parker, Ellsworth, Kans.; Carl N. Rydin, Naperville, Ill.

[73] Assignee: Parkton Corporation, Ellsworth, Kans.

[22] Filed: Jan. 17, 1972

[21] Appl. No.: 218,150

Related U.S. Application Data

[63] Continuation-in-part of Ser. No. 79,783, Oct. 12, 1970, abandoned.

[52] U.S. Cl. ............... 56/11.6, 56/16.9, 56/256
[51] Int. Cl. ............................................. A01d 69/08
[58] Field of Search .................. 56/11.6, 16.9, 17.1, 56/17.2, 17.4, 17.5, 256

[56] References Cited
UNITED STATES PATENTS

| | | | |
|---|---|---|---|
| 3,490,213 | 1/1970 | Pinto | 56/16.9 |
| 2,862,344 | 12/1958 | Caudle | 56/256 |
| 3,668,845 | 3/1970 | Parker | 56/16.9 |

*Primary Examiner*—Antonio F. Guida
*Assistant Examiner*—J. Q. Lever
*Attorney*—Ronald L. Engel et al.

[57] ABSTRACT

A rotary lawn mower including an engine, an edger-trimmer unit mounted on the mower and driven by the engine, power control means for engaging and disengaging the drive to the unit, and position control means for moving the unit between its edging and trimming positions. Coordinating means interrelates the power control means and the position control means to insure that the drive is always disengaged before the position control means can move the unit. Caster wheels are provided on the mower opposite the unit for ease of maneuvering and height control means engageable with the caster wheels raise and lower the mower to respectively lower and raise the unit.

9 Claims, 20 Drawing Figures

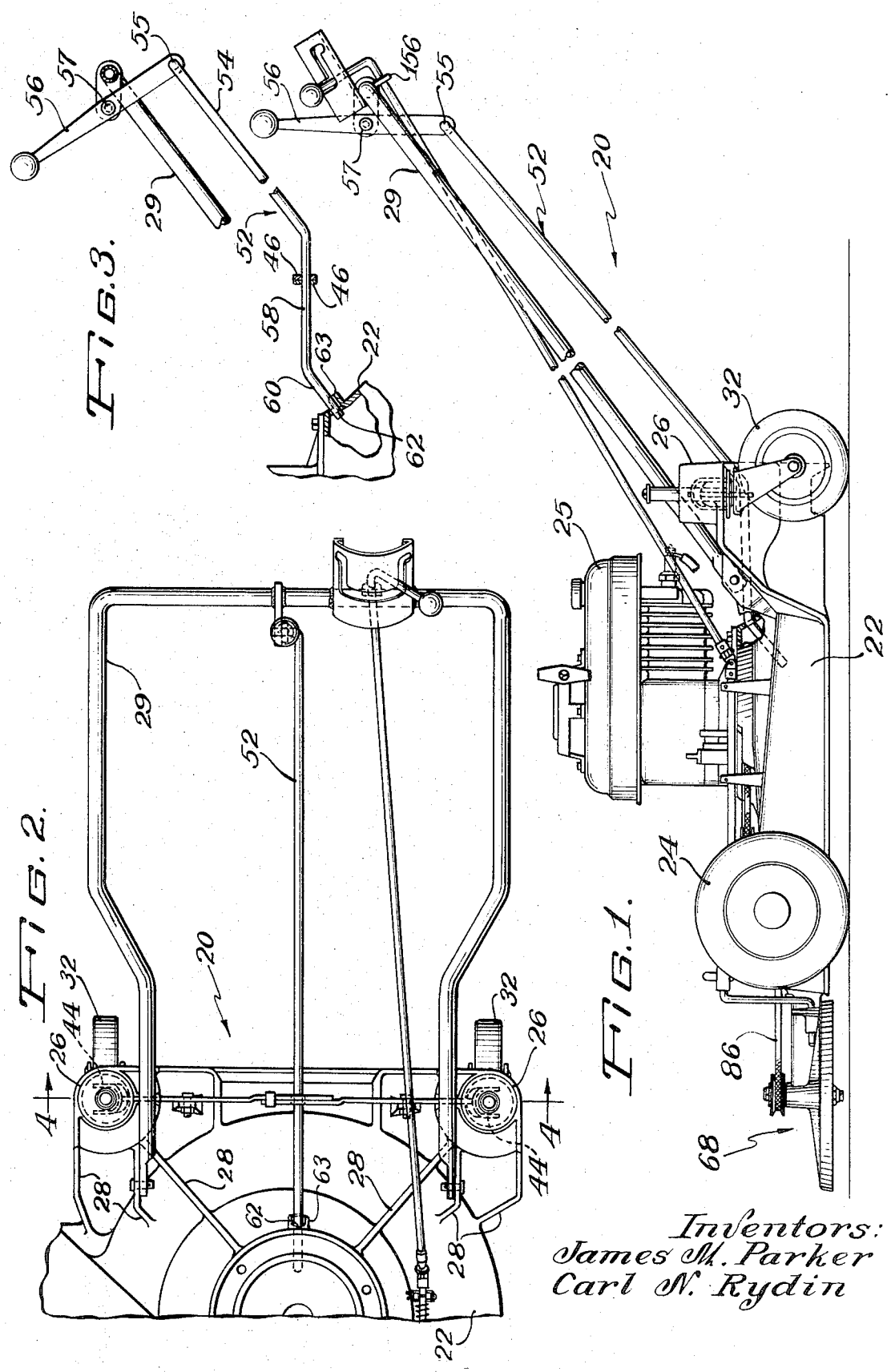

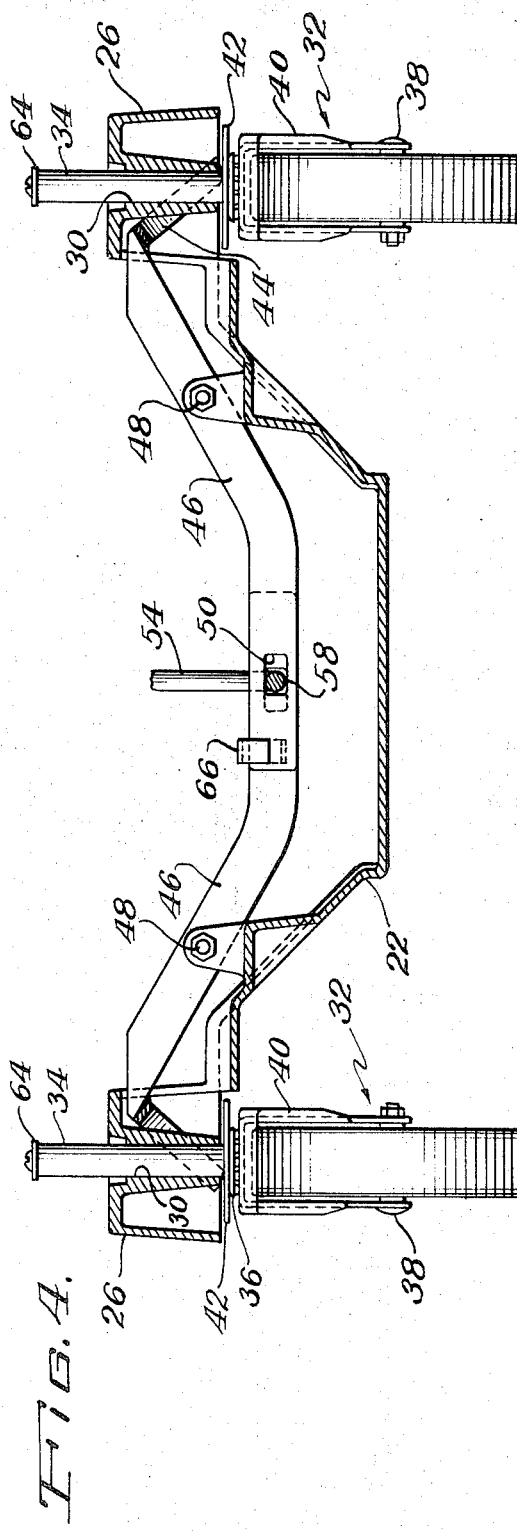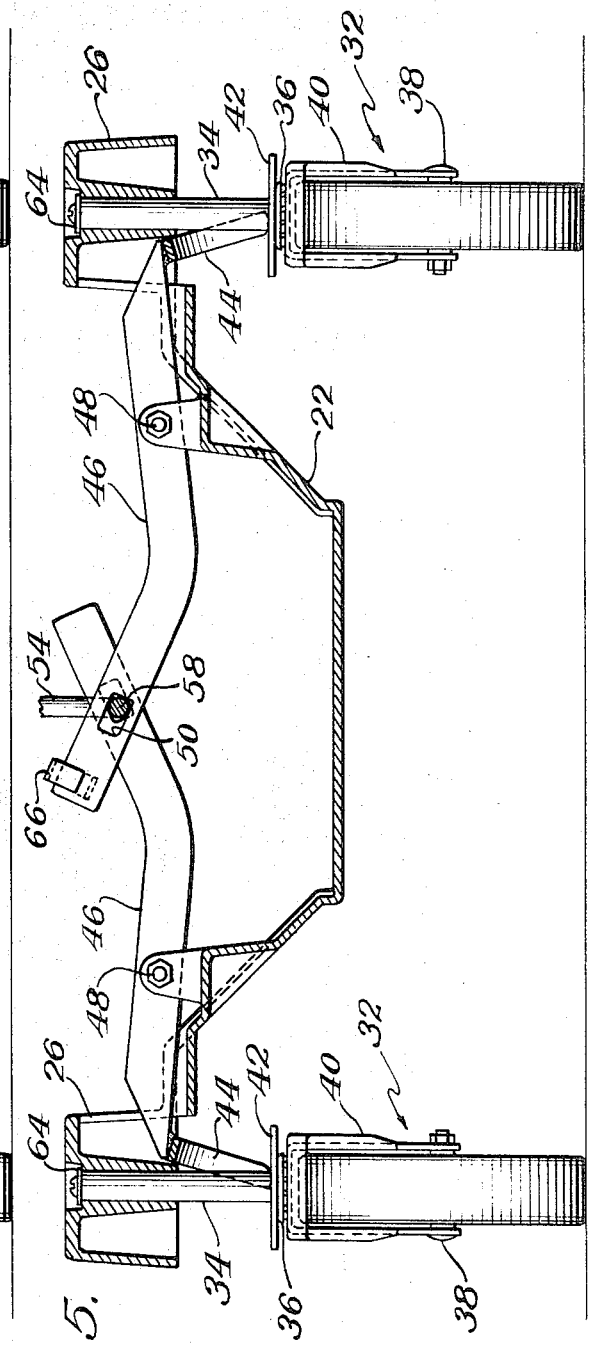

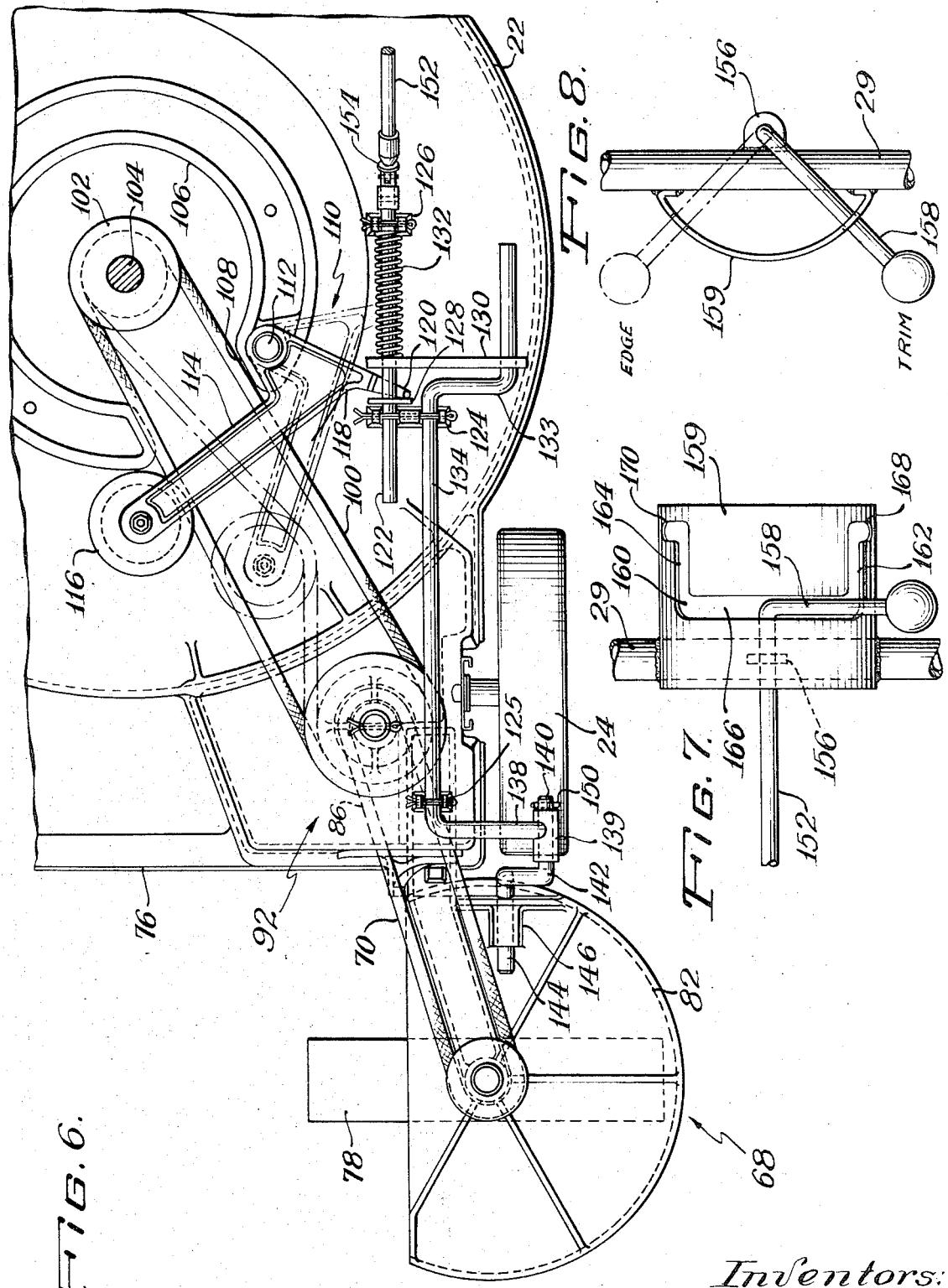

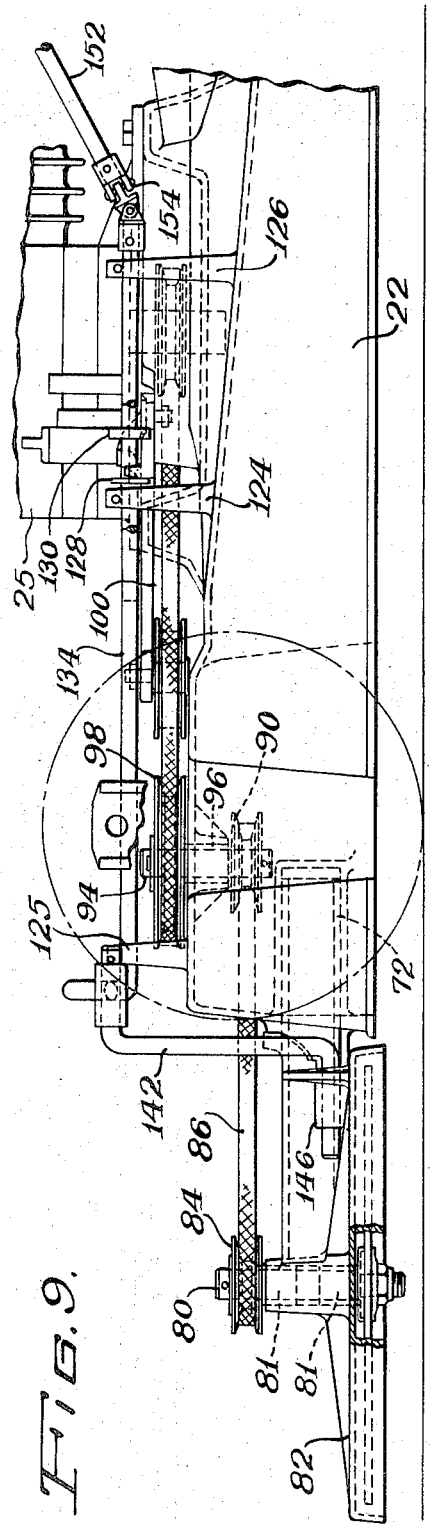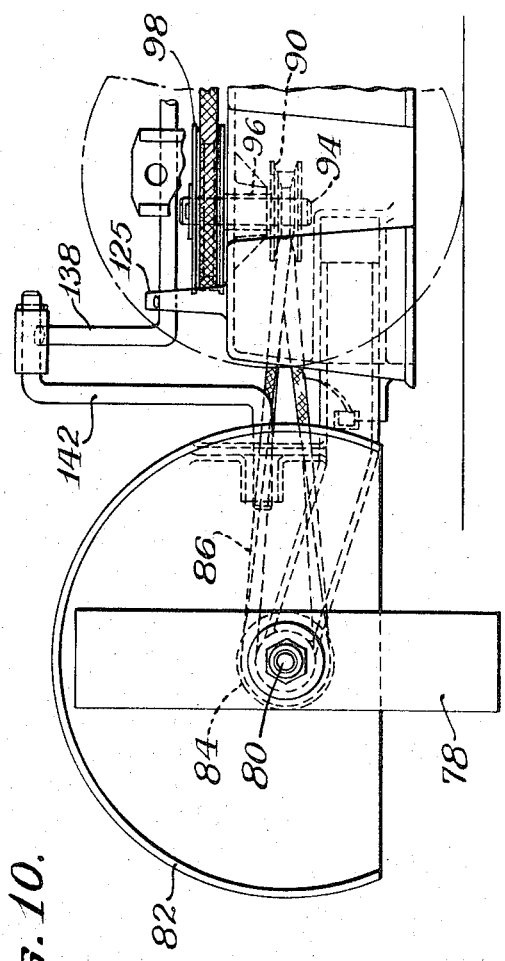

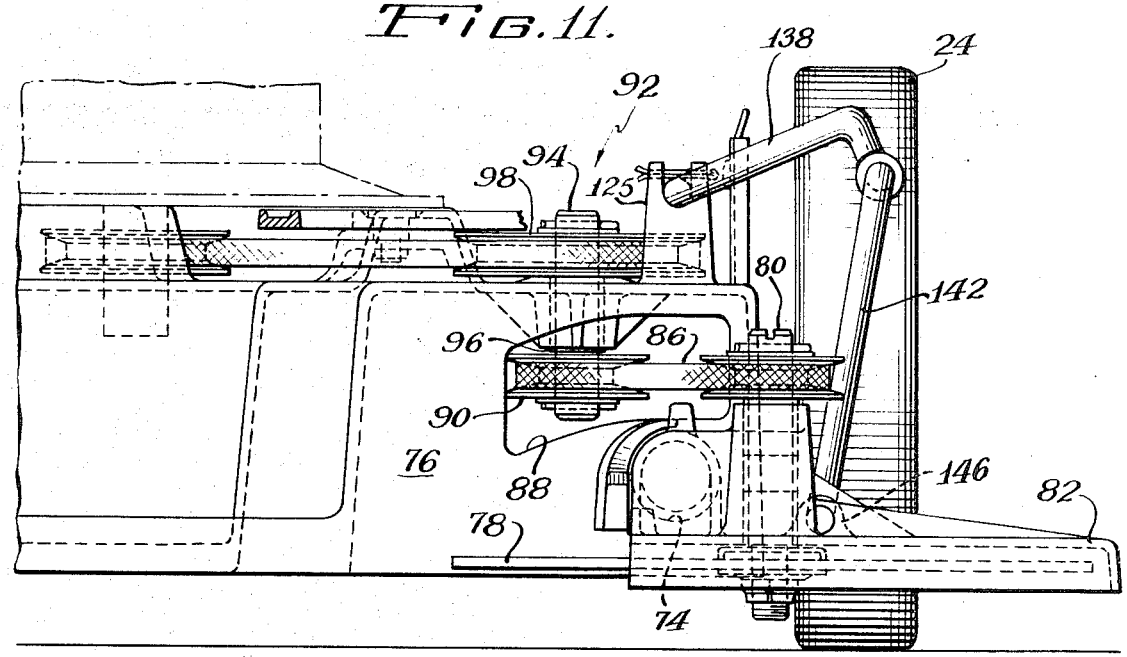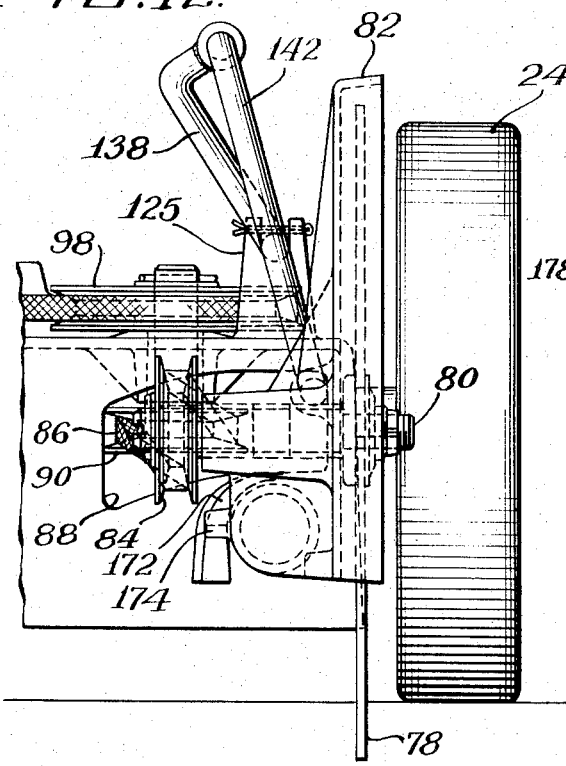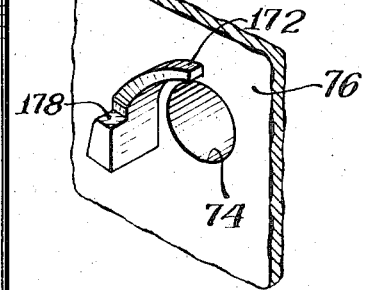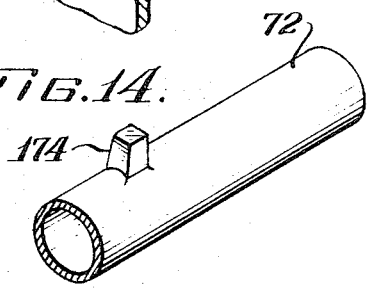

Inventors:
James M. Parker
Carl N. Rydin

Inventors:
James M. Parker
Carl N. Rydin

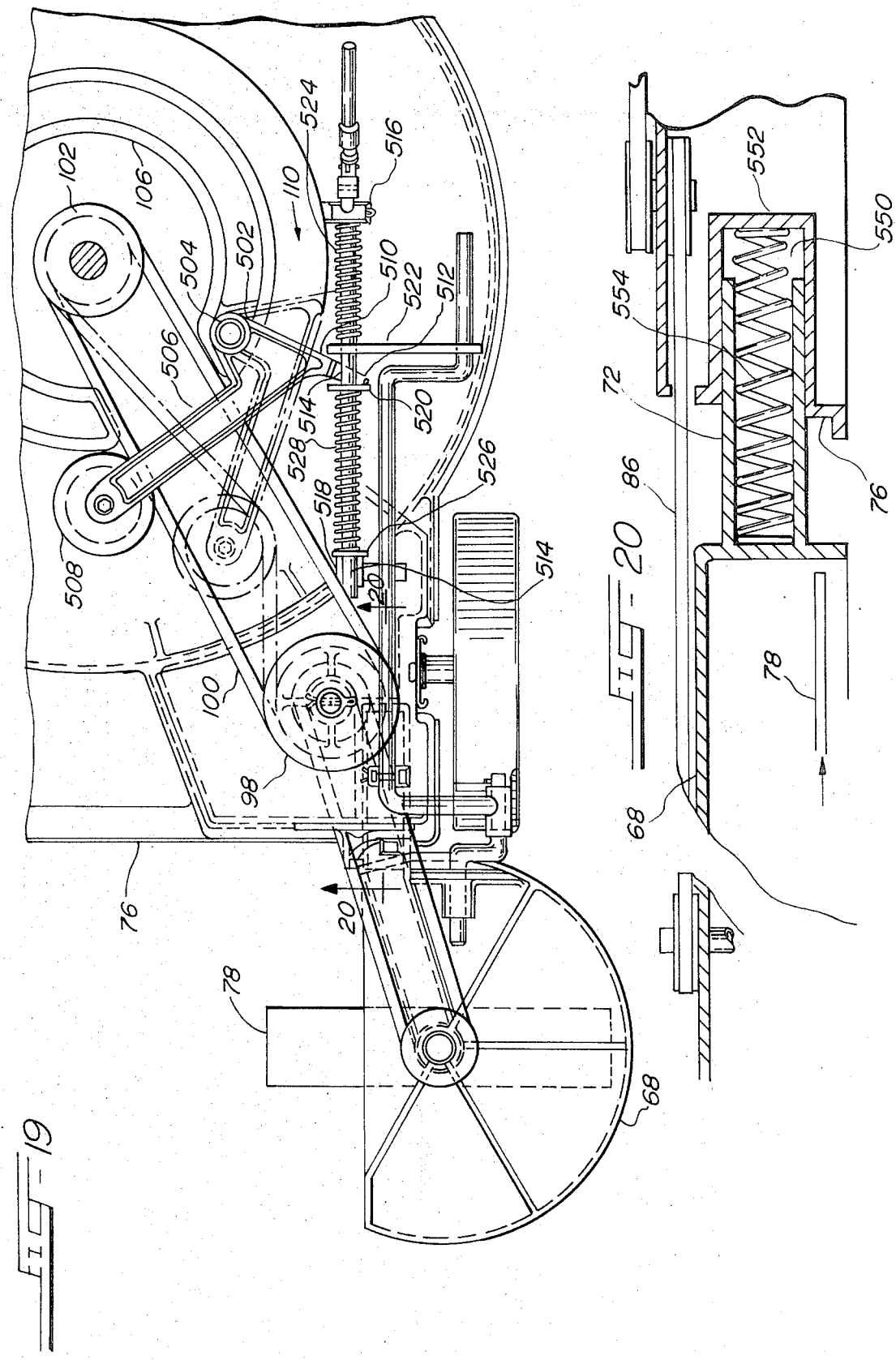

3,782,085

LAWN MOWER AND AUXILIARY UNIT WITH CONTROL MEANS

CROSS-REFERENCE TO RELATED APPLICATION

This is a continuation-in-part application of copending application Ser. No. 79,783, filed Oct. 12, 1970 now abandoned.

This invention is also related to that disclosed and claimed in the application of James M. Parker, Ser. No. 17,753, filed Mar. 9, 1970, and entitled "IMPROVED LAWN MOWER APPARATUS".

BACKGROUND OF THE INVENTION

1. Field of the Invention

This invention relates to lawn mowers generally and more particularly to means for maneuvering and controlling the lawn mower and an auxiliary unit driven thereby.

2. Description of the Prior Art

Rotary type lawn mowers heretofore known to the art typically have not included an auxiliary unit capable of performing an edging or a trimming operation. Further, prior art lawn mowers capable of also either edging or trimming or both have involved inconvenient and cumbersome arrangements requiring difficult adjustments or operations to permit shifting of the auxiliary unit from an edging to a trimming position and visa versa, adjustment of the height of the auxiliary unit and removal of the auxiliary unit. Further, prior art arrangements have not provided a means for disengaging the drive to the auxiliary unit during operation or while the unit is being shifted between its edging and trimming positions.

A lawn mower of the conventional rotary type is supported on four ground-engaging wheels which are rotatable about fixed axes. When turning, i.e., changing the direction of movement, it is inherent that two of the four wheels must "scrub". That is, two wheels must be dragged on the ground in a direction transverse to their plane of rotation. Operators of such conventional mowers have customarily depressed the mower handle to lift the front wheels off the ground. Such a procedure eliminates the wheel scrubbing, but requires that a portion of the mower's weight be lifted. Also, the mower and any auxiliary unit is rendered, at least partially, ineffective while the mower is so oriented. As a result, mowing close to and around obstacles is at best difficult and often impossible with conventional lawn mowers.

It is, therefore, an object of the present invention to provide a lawn mower which is easily maneuverable, which can be maneuvered while in its optimum operating attitude, and which readily permits maximum utilization of the auxiliary unit.

Another problem, of prior art lawn mowers was the control of an auxiliary unit. There was often no means for disengaging drive to the auxiliary unit while permitting the engine and main mower blade to continue operation. Moving the unit between its trimming and edging positions was dangerous because such adjustment could not be accomplished remotely and/or required a plurality of levers or controls and a conscious sequencing thereof.

It is also an object of this invention to provide a lawn mower with a auxiliary unit having control means which solve the problems of the prior art mentioned above.

It is another object of this invention to provide a control means for an auxiliary unit which permits independent disengagement of the drive thereto, which permits such drive control and control of the unit's position from a location remote from the unit, but convenient to and safe for the operator, and which permits effecting both drive and position control by a single manually operable means.

It is still another object of this invention to provide a lawn mower with an auxiliary unit having control means which requires that the drive to the unit is disengaged before movement of the unit between its two positions can be initiated.

It is a further object to provide a means for adjusting the vertical height of the auxiliary unit from a remote location which is convenient for the operator.

It is a still further object to provide an improved cam means for maintaining substantially constant tension in the belt drive to the unit as the unit is moved between its two positions.

It is another object of this invention to provide a deck for a lawn mower which complements and optimizes the functions described previously.

These and other objects and many of the attendant advantages will become readily apparent from the following description and the accompanying drawings.

SUMMARY OF THE INVENTION

A rotary lawn mower in accordance with the present invention comprises a deck, an engine mounted on the deck, a primary grass cutting blade connected to and driven by the engine and a handle attached to the deck for maneuvering the mower. An auxiliary unit disengageably engaging the engine for receiving driving power is mounted on one end of the deck for rotating between a first and a second operative position. A control lever is mounted on the handle for manipulation in a first and a second direction and control linkage means is interconnected between the control lever and the auxiliary unit so that operator manipulation of the control lever in the first direction selectively engages and disengages driving power to the auxiliary unit, and manipulation in the second direction rotates the auxiliary unit between the first and second operative positions.

BRIEF DESCRIPTION OF THE DRAWINGS

FIG. 1 is a side elevational view of a lawn mower according to the present invention.

FIG. 2 is a top plan view of the lawn mower shown in FIG. 1 with portions broken away and eliminated.

FIG. 3 is a side elevational view, with portions broken away, showing a preferred embodiment of the caster wheel height control means.

FIG. 4 is a cross-sectional view taken on line 4—4 of FIG. 2 showing the deck in its lowered position.

FIG. 5 is a view similar to FIG. 4, but showing the deck in its raised position.

FIG. 6 is a top plan view of the right front portion of the mower shown in FIG. 1.

FIG. 7 is a detailed plan view of the single lever control and the coordinating means therefor.

FIG. 8 is an end view in elevation of the means shown in FIG. 7.

FIG. 9 is a side elevational view of the mechanism shown in FIG. 6.

FIG. 10 is a detail side view of a portion of FIG. 9, but showing the auxiliary unit pivoted into its edging position.

FIG. 11 is a front elevational view of the mechanism shown in FIG. 9.

FIG. 12 is a front elevational view of the mechanism shown in FIG. 10.

FIG. 13 is a detail view of the cam means on the deck.

FIG. 14 is a detail of the cam follower means associated with the cam means of FIG. 13.

FIG. 19 is a top partially fragmentary view of the right front portion of the mower shown in FIG. 1.

FIG. 20 is a cross-sectional partially fragmentary view taken substantially along line 20—20 in FIG. 19.

DETAILED DESCRIPTION OF THE PREFERRED EMBODIMENT

Figure 15:
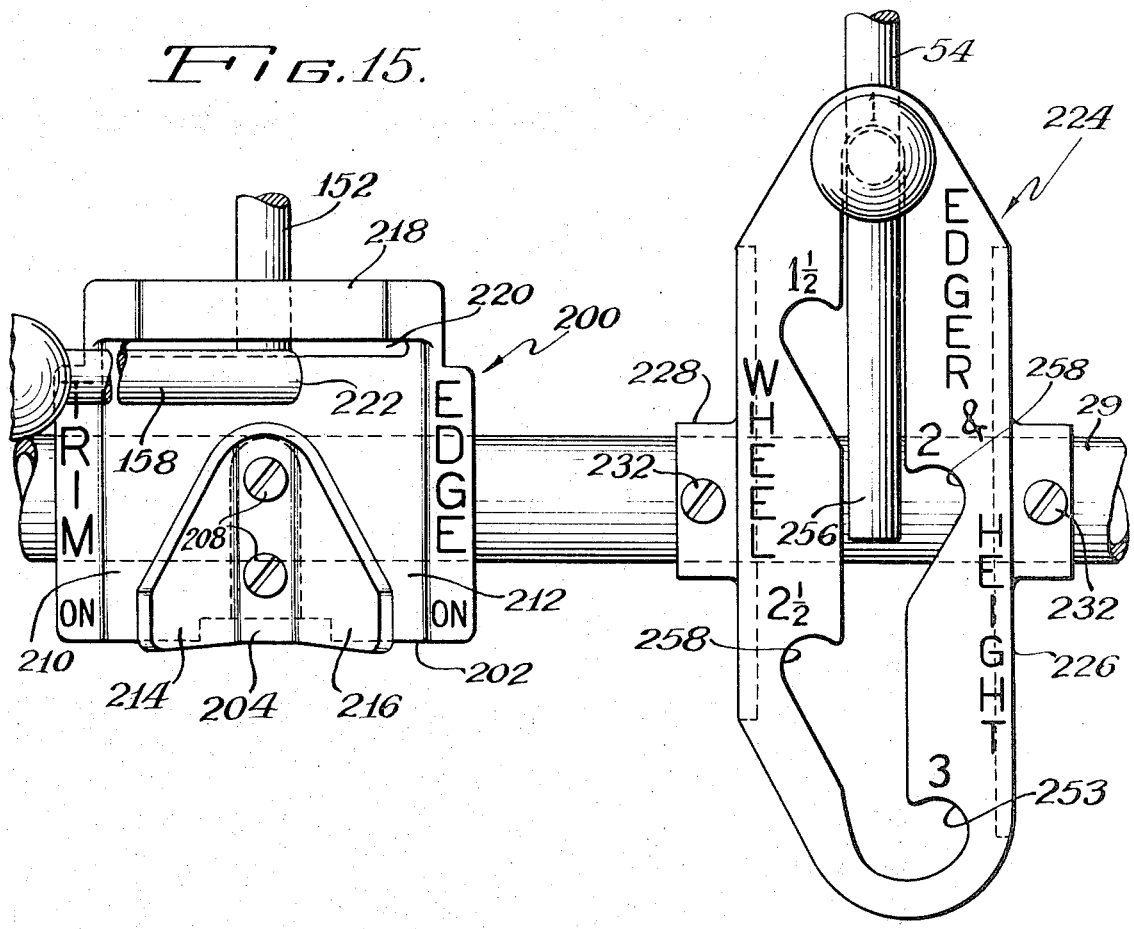
FIG. 15 is a top partially fragmentary view of the position control and edge height control mechanisms of the present invention.

Referring now to FIG. 1, there is shown a walk-behind mower, indicated generally at 20, provided with a deck or housing to which a pair of rotatable, ground engaging wheels 24 are secured in a conventional manner. An engine 25 is mounted on the deck and drives a main mower blade (not shown). The deck 22 is provided with a pair of towers 26 adjacent the rear end. These towers 26 extend upward and are reinforced by a plurality of upstanding webs 28. As shown in FIG. 2, a handle 29 is pivotably secured to two of the webs 28. A vertical bore is provided within each tower, as best shown in FIGS. 4 and 5. A caster wheel 32 having a vertical spindle 34 is received in each of the bores 30. Each of these wheels is rotatable about a horizontal axis defined by the bolt 38, which retains the wheel within a fork 40 secured to the spindle 34, but rotatable relative thereto about a vertical axis. A ball bearing 36 is interposed between the top of the fork 40 and a plate 42 which rests on the upper race of each bearing 36. The bifurcated end 44 of a lever 46 rests on the top of each of the plates 42. Each lever 46 is pivotally secured at 48 to the deck 22 at a point intermediate the ends of the lever. The other end of each lever 46 is provided with a slot 50. A rod 52 extends through both of the slots 50. The rod 52 includes an upward extending portion 54, which is substantially parallel to the mower handle 29, and has its upper end pivotally secured at 55 to a handle 56. The handle 56 is pivotally mounted at 57 to the cross-bar of the mower handle 29. The rod 52 has an intermediate, generally horizontally disposed portion 58 which passes through the slots 50 and terminates at its lower end with a downward and forward inclined portion 60 substantially parallel to the portion 54. The inclined portion 60 passes through an opening 62, as best seen in FIGS. 2 and 3, in the deck 22. With the handle 56 rotated to the position shown in FIG. 1, the inclined portion 60 will be inserted a maximum amount, but short of interferring with the main mower blade, causing the horizontal portion 58 to be positioned at its lowest elevation. This will permit the rear end of the deck to assume the lowered position shown in FIG. 4. When the handle 56 is rotated to the position shown in FIG. 3, the inclined portion 60 will be withdrawn from the opening 62 causing the horizontal portion 58 to be raised vertically. The vertical elevation of this portion 58 raises the inner ends of the levers 46. The upward movement of the slots 50 pivots the levers about 48 thereby forcing the bifurcated ends 44 to push the plates 42 downward. Forcing the plates 42 downward raises the rear end of the deck 22, as shown in FIG. 5. Raising and lowering the rear of the deck adjusts the vertical height of the auxiliary jnit.

In order to accommodate the raising and lowering of the rear end of the deck, the spindles 34 have a length greater than the length of the bores 30. To preclude the caster wheels from dropping out of these bores, should the deck itself be lifted or a deep depression encountered, a washer 64, having a diameter greater than the bore 30, is secured to the top of each spindle 34. A clip 66 is secured to one of the levers 46 and is capable of engaging the other lever when the deck is in its lowered position. This prevents lateral separation of the levers and minimizes rattling.

Referring now to FIGS. 6 and 9-12, the auxiliary unit, indicated generally at 68, comprises a frame 70 including a tubular extension 72 which is received in an opening 74 in the front wall 76 of the deck 22. An auxiliary blade 78 is secured to one end of a shaft 80 rotatably mounted in sleeve bearings 81 carried by the frame 70. The frame includes a generally circular housing 82 which partialy shrouds the blade 78. A pulley 84 is secured to the other end of the shaft 80. A belt 86 extends around the pulley 84, through an arcuate opening 88 in the front wall 76, and around a pulley 90 rotatably mounted within a power cell 92 positioned in the left front corner of the mower deck 22. The power cell comprises a shaft 94 rotatably supported by a sleeve bearing 96 mounted in the deck 22. The pulley 90 is secured on one end of shaft 94 below the deck 22 and a second pulley 98 is affixed to the other end of shaft 96 above the deck 22. A second belt 100 extends around the pulley 98 and passes around a pulley 102 secured to the drive shaft 104 of the engine 25. A collar 106 raises the engine 25 above the deck and a slot 108 in the collar 106 permits the belt 100 to pass under the engine and above the deck. The belt 86 is always in tight driving relationship with the two pulleys 84 and 90, while the belt 100 is not. A belt tightener 110 is provided to selectively tighten and loosen the belt 100 to respectively engage and disengage the drive to the auxiliary unit 68.

The belt tightener 110 comprises a bell crank 112 pivotally mounted on a pin 113 positioned in the collar 106. One arm 114 of the bell crank rotatably supports an idler pulley 116, while the other arm 118 is provided with a forked end 120. A rod 122 is slidably supported in a pair of supports 124 and 126 secured to and upstanding from the deck. The forked end 120 engages the rod 122 between a pair of abutments 128 and 130 affixed to the rod. The forward abutment 128 is capable of engaging the forward support 124 and limits the movement of the rod 122 toward the left as viewed in FIG. 6. A compression spring 132 is trapped between the rear abutment 130 and the rear support 126 and urges the rod 122 toward the left as viewed in FIG. 6. Moving the rod 122 toward the right compresses the sring 132 and causes the forward abutment 128 to pivot the bell crank 112 counterclockwise about the pin 113. Such pivoting of the bell crank causes the idler pulley 116 to tighten the belt 100 so that it can transmit power.

The rear abutment 130 is also rotatably secured to the rear throw 133 of a crank rod 134. The crank rod 134 is provided with a rotation axis through retention in aligned supports, one of which is a groove in the forward support 124 and a groove in the support 125 adjacent the power cell. The crank rod is retained in the grooves by cotter pins which extend over the top of the crank rod and through aligned holes in each support. The front throw 138 of the crank rod is rotatably secured to one leg 140 of a position rod 142. The other leg of the position rod 142 passes through a bearing 146 secured to the outer surface of housing 82. Rotation of the rod 122 will cause the crank rod 134 to rotate about its axis due to the connection between the abutment 130 and the rear throw 133. Rotation of the crank rod 134 will thereby cause the entire auxiliary unit 68 to rotate about the tubular extension 72. The trimming position for the unit 68 is shown in FIGS. 6, 9 and 11, while the edging position is shown in FIGS. 10 and 12.

The rod 122 is connected to an actuating rod 152 through a universal joint 154. The actuating rod 152 is supported on the cross-bar of the mower handle 29 by a backet 156 which permits both axial movement and rotation of the actuating rod. As best seen in FIGS. 7 and 8, the actuating rod 152 has a handle portion 158 which extends through an arcuate plate 159 secured to the handle cross-bar 29. The plate 159 has a generally U-shaped slot 160, which includes a pair of rearward extending sections 162 and 164 and a connecting transverse section 166. The transverse section 166 permits the actuating rod 152 to be pivoted about its axis, while the two rearward sections 162 and 164 permit the actuating rod 152 to be moved axially. Positioning the actuating rod 152 as shown in FIG. 7 causes the unit 68 to be oriented in its trim position and rotation of the rod 152 to the dotted line position of FIG. 8 orients the unit 68 in its edge position. As long as the handle portion 158 is in the transverse section 166, the idler pulley 116 will be in its disengaged position, as shown by solid lines in FIG. 6. Moving the handle portion 158 rearward in either of the rearward sections 162 and 164 will cause the belt tightener 110 to engage the drive to the power cell 92 and hence to the unit 68.

The extreme rearward ends of each section 162 and 164 are provided with outward extending detents 168 and 170, which accept the handle portion 158. When the handle portion 158 is slipped into one of the detents 168 or 170, the actuating rod 152 will be held in its drive engaged position against the bias of compression spring 132. With the handle portion in the detent 168, the unit 68 will be in the trim position shown in FIG. 11 with the drive engaged. The weight of the unit will tend to rotate the unit clockwise, as viewed in this FIGURE, arcuate plate 159 will resist such movement. In the edge position, the weight of the unit would tend to dislodge the handle portion 158 from its detent 170. However, the position rod 142 is designed to pass through the pivot axis of the crank rod 134 and to go slightly overcenter in its edge position, as shown in FIG. 12. This relationship assures that the handle portion 158 will remain in its detent 170 until the operator dislodges it. Dislodging the handle portion 158 from either of the detents 168 and 170 will permit the compression spring to immediately disengage the drive to the power cell 92.

Referring now to FIGS. 13 and 14, the front wall 76 of the deck 22 is provided with an outward projecting cam 172. A cam follower consisting of a lug 174 formed on the tubular extension 72. The lug 174 is urged into contact with the cam 172 by the tension in the belt 86. The cam 172 has an arcuate shape and a progressively greater thickness from a point just above the opening 74 to a location 90° counterclockwise therefrom. The progressive thickness is designed to maintain a substantially constant tension in the belt as the unit 68 is moved between its trim and edge positions. A shoulder 178 on the cam 172 assists in maintaining the unit in its edge position.

An alternative embodiment to maintain a substantially constant tension in belt 86 as unit 68 is moved between its trim and edge positions is shown in FIG. 20. Opening 74 is open to a cylindrical cavity 550 having end wall 552 opposite opening 74. Tubular extension 72 slidably mates with cylindrical cavity 550. Positioned within tubular extension 72 is spring 554 which presses against end wall 552 and tends to urge tubular extension 72 and unit 68 to the left as shown in FIG. 20. Thus, as unit 68 is moved between its trim and edge positions, spring 554 can contract or expand to move unit 68 relative to the front wall 76, and thus, maintain the tension in belt 86 to compensate for the change in belt length resulting from the twisting of belt 86.

The unit 68 can be readily detached from the mower by removing the belt 86 from the pulley 84. This permits the leg 140 to be withdrawn from the bearing 139 secured to the front throw 138 as tubular extension 72 is simultaneously withdrawn from the opening 74. Installation simply involves a reversal of the above procedure.

Figure 16:
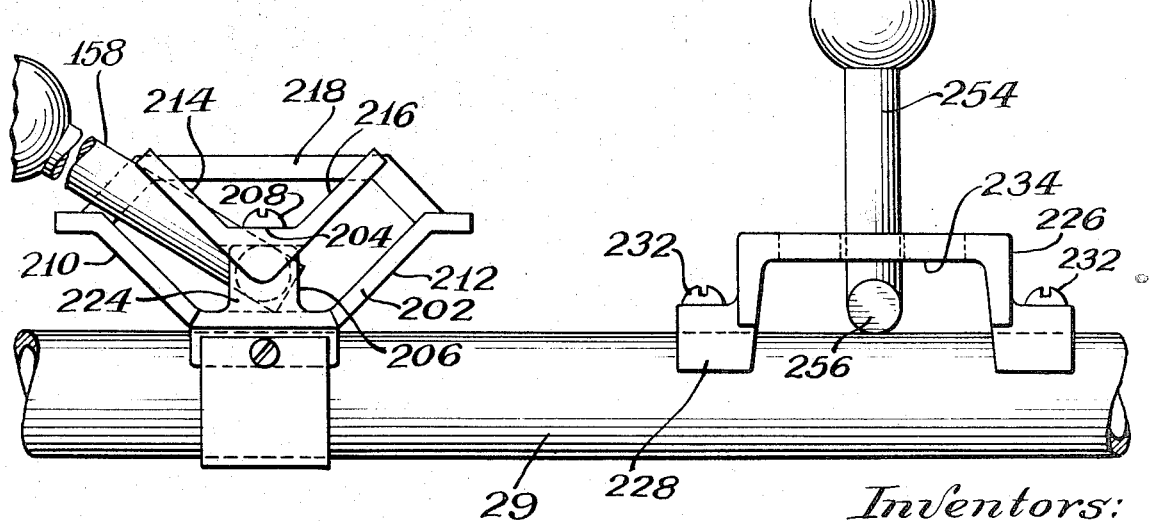
FIG. 16 is a side partially fagmentary view of the mechanisms shown in FIG. 15.

Another embodiment of position control and wheel height control is shown in FIGS. 15 and 16. The position control, indicated generally at 200, comprises a lower member 202 which is secured by conventional means to a cross-bar on the mower handle 29, and preferrably on a cross-bar positioned immediate the handle's length such as that usually present on conventional folding handles, and an upper member 204. The upper member 204 engages the flat upper surface of a projection 206 formed on the lower member 202 and is held in place by a pair of bolts 208 passing through holes in the upper member 204 and threadedly engaging tapped holes in the projection 206. The lower member 202 has a pair of upward and outward diverging flanges 210 and 212 which extend parallel to a similar pair of flanges 214 and 216 formed on the upper member 204. The space between the flanges 212 and 216 and between the flanges 210 and 214 form a pair of guide channels for the control handle portion 158. The lower member 202 has a length greater than the upper member and has a bridge member 218 interconnecting the two flanges 210 and 212 at the end of the lower member opposite its connection with the upper member. The bridge member 218 defines, with the lower member, an opening 220 through which the actuating rod passes. The space between the end of the upper member 204 and the bridge member 218 permits the handle portion 158 to project above the upper member 204 and to be pivoted between trim and edge positions. A latching projection 222 is attached to the curved transition between the rod 152 and its handle portion 158. A pair of flanges 224 and 226 formed on the outer end of the projection 206 are engageable by the latching projection 222 to retain the handle portion 158 in its ON position in the trim and edge attitudes. Operation of the position control means 200 is the same as the embodiment shown in FIGS. 7 and 8.

The second embodiment of wheel and edger height control, indicated generally at 224, also shown in FIGS. 15 and 16, comprises a body member 226 with a pair of downward depending flanges 228 and 230. The flanges 228 and 230 are shaped to engage the handle 29 and secure the body member 226 to the handle by conventional means, such as machine screws 232. Since the flanges extend downward, the body member 226 will be elevated above the handle 29 with the flanges in engagement therewith. The underside of the body member 226 has a central groove 234 which permits the upper portion 54 of the height control rod 52 to pass over the top of the handle 29 but beneath the body member 226. A handle portion 254 is formed substantially perpendicular to the rod portion 54 and extends upward through an arcuate slot 256 in the body member 226. The slot 256 has a plurality of lateral notches 258 spaced along the length of and on alternate sides thereof. The handle portion 254 can be positioned in any one of the notches 258 to vary and control the height of the wheels, i.e., the amount of elevation at the rear of the deck and hence the depth of cut the edger will make. The rod 52 operates on the wheel adjustment means in the same manner as previously described.

Figure 18:
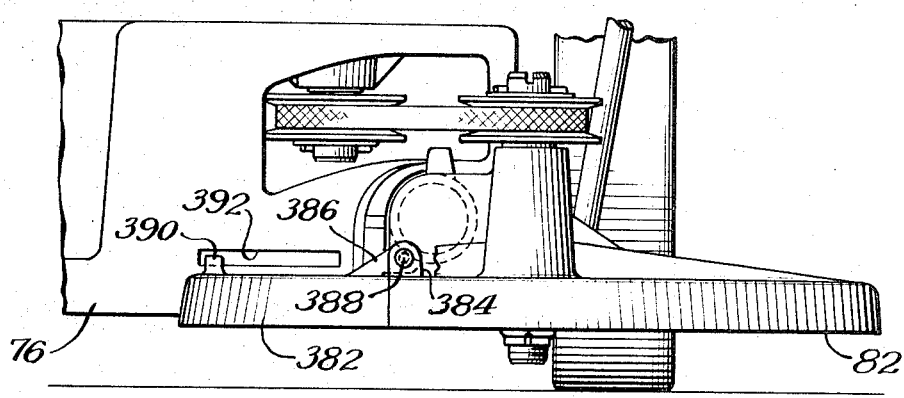
FIG. 18 is a front partially fragmentary view of the unit shown in FIG. 17.
Figure 17:
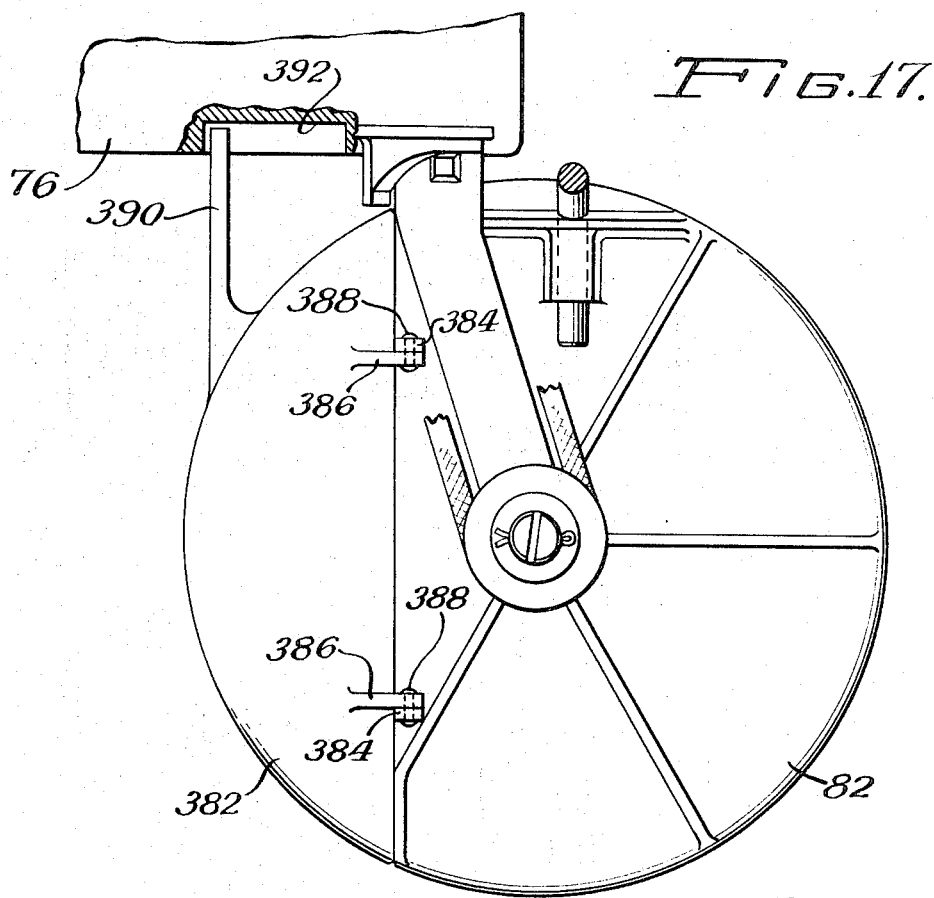
FIG. 17 is a top partially fragmentary view of the auxiliary unit of the present invention.

Referring now to FIGS. 17 and 18, there is shown sector safety housing for the auxiliary blade which provides complete overhead and peripheral coverage for the blade in the trim position and still permits the blade to project beyond the housing in the edge position for effective edging. The generally circular housing 82 is the same as that described in connection with FIGS. 6, 11 and 12. A circular sector 382 complements the housing 82 and completes the full circle for enclosing the auxiliary blade 78. A pair of upstanding ears 384 are attached to the upper surface of the housing 82. A pair of laterally extending ears 386 are attached to the sector 382 and mate with the ears 384. Pins 388 extend through aligned bores in the mating ears and form a hinge, permitting the housing 82 to rotate relative to the sector 382. An arm 390 is attached to the sector 382 and extends toward the front wall 76 of the mower deck 22, where it engages a slot 392 formed therein. The slot 392 is substantially horizontal and has a length sufficient to permit the housing 82 to be rotated to its vertical or edge position. The height or width of the slot 392 is also slightly greater than the vertical thickness of the arm 390 in order to permit a slight amount of rotation of the arm in the slot. With the housing 82 in its trim position, the arm 390 is positioned within the left end of the slot, as viewed in FIGS. 17 and 18. The arm 390 rests on the slot 392 and helps to support the free side of the sector 382. When the housing 82 is rotated, as previously described, to its edge position the hinge action of the ears 382 and 384 and the pins 388 allow the housing to pivot relative to the sector 382 and the arm 390 to slide to the right within the slot 392. The blade is thereby uncovered and in a vertical position for edging. Returning the auxiliary unit to its trim position causes the arm 390 to slide to the left into position to cover the blade 78 as it assumes a horizontal attitude.

With reference to FIG. 19, an alternative embodiment of a belt tightener 500 is shown. Belt tightener 500 is similar to belt tightener 110 shown in FIG. 6 and previously described except that it has been modified to provide for more constant friction between belt 100 and idler pulley 508. Belt tightener 500 comprises belt crank 502 pivotally mounted by pin 504 mounted to collar 106. First arm 506 of belt crank 502 rotatably supports an idler pulley 508. Bell crank 502 has a second arm 510 which has a forked end 512. A rod 514 is sidably supported by a pair of supports 516 and 518 mounted on the deck. Forked end 512 engages rod 514 between a pair of abutments 520 and 522 on rod 514. Abutment 522 is firmly attached to rod 514 while abutment 520 slidably engages rod 514. A compression spring 524 is trapped between the rear abutment 522 and rear support 516, and urges rod 514 toward the left as viewed in FIG. 19. Also affixed to rod 514 is abutment 526 and positioned between abutment 526 and abutment 520 is belt tension spring 528. Belt tension spring 528 tends to urge slidable abutment 520 to the right as shown in FIG. 19. When bell crank 502 is in the position shown by the solid lines in FIG. 19, belt tension spring 528 is fully expanded and thus no pressure is exerted by belt tension spring 528 against abutment 520. When rod 514 is moved to the right, abutment 520 presses against second arm 510 causing abutment 520 to slide against belt tension spring 528. The urging of spring 528 causes bell crank 502 to rotate until idler pulley 508 engages belt 100 as shown by the dotted lines in FIG. 19 thus causing belt 100 to engage pulleys 98 and 102. In this position, belt tension spring 528 is compressed, and thus, tends to hold idler pulley against belt 100 with relatively constant pressure regardless of the amount of wear of belt 100 or the amount that belt 100 has stretched from use.

We claim:

1. In a rotary lawn mower having a deck, an engine mounted on the deck for driving a primary grass cutting blade, a handle attached to the deck for maneuvering the mower, an auxiliary unit mounted at one end of the deck, the auxiliary unit comprising a rotatably mounted auxiliary grass cutting blade and the auxiliary unit mounted for rotation so that the auxiliary blade can be moved between a horizontal first operative position and a vertical second operative position and the auxiliary unit further comprising a drive belt means connected between the engine and the auxiliary unit for disengageably engaging the engine to operably drive the auxiliary blade, and wheels mounted on the end of the deck adjacent the auxiliary unit for moving the deck over the earth's surface; wherein the improvement comprises:

a control lever mounted on the handle for operator manipulation in a first and a second direction;

control linkage means interconnecting said control lever with the auxiliary unit comprising:

a shaft means mounted for lateral and rotational movement, said shaft means connected between the auxiliary unit and said control lever so that manipulation of said lever in the first direction causes said shaft means to move in a longitudinal direction and manipulation of said lever in the second direction causes said shaft means to rotate;

pulley means operably connected to said shaft means so that longitudinal movement of said shaft means causes said pulley means to disengageably engage said drive belt means to cause said drive belt means to disengageably engage the engine to operably drive the auxiliary blade;

said shaft means being adapted to rotate said auxiliary unit so that said auxiliary blade is moved from its first to its second operative positions when said lever is manipulated in its second direction.

2. The invention in accordance with claim 1 wherein the improvement further comprises:
a pair of caster wheels mounted on the end of the deck opposite the auxiliary unit.

3. The invention in accordance with claim 2 wherein the improvement further comprises:
elevating linkage means interposed between the deck and the caster wheels for elevating and lowering said caster wheels to respectively lower and elevate the auxiliary unit in response to operator manipulation.

4. The invention in accordance with claim 1 the invention further comprising compensating means operably associated with the deck and the auxiliary unit for moving the auxiliary unit inward and outward relative to the deck to maintain a constant operative relationship between the auxiliary unit and the drive belt means as the auxiliary unit is moved between the first and the second operative positions.

5. The invention in accordance with claim 4 wherein said compensating means comprises spring means positioned between the deck and the auxiliary unit tending to urge auxiliary unit in an outwardly direction with respect to the deck.

6. The invention in accordance with claim 4 wherein said compensating means comprises cam and follower means operably associated with the deck and the auxiliary unit.

7. The invention in accordance with claim 1 further comprising disconnectable mounting means for mounting the auxiliary unit to the deck for permitting the auxiliary unit to be quickly removed from said deck without the utilization of tools.

8. The invention in accordance with claim 7 wherein the disconnectable mounting means comprising:
a hollow tubular protrusion mounted to the auxiliary unit;
a cylindrical receptacle formed in one end of the deck for receiving and pivotably supporting said tubular protrusion;
spring means positioned within the hollow tubular protrusion for engaging with said cylindrical receptacle and tending to urge said tubular protrusion out of said cylindrical receptacle;
said drive belt means engaging the auxiliary unit so that said tubular protrusion is retained in said receptacle and said drive belt means being removable without the use of tools so that said tubular protrusion may be removed from said receptacle to remove the auxiliary unit from the deck.

9. The invention in accordance with claim 1 wherein the improvement further comprises:
bias means operably associated with said shaft means and said pulley means for maintaining a constant operative relationship between said pulley means and said drive belt means when said pulley means engages said drive belt means.

* * * * *